US010607604B2

(12) United States Patent
Itoh et al.

(10) Patent No.: US 10,607,604 B2
(45) Date of Patent: Mar. 31, 2020

(54) METHOD FOR RE-ALIGNING CORPUS AND IMPROVING THE CONSISTENCY

(71) Applicant: INTERNATIONAL BUSINESS MACHINES CORPORATION, Armonk, NY (US)

(72) Inventors: Nobuyasu Itoh, Yokohama (JP); Gakuto Kurata, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 41 days.

(21) Appl. No.: 15/795,932

(22) Filed: Oct. 27, 2017

(65) Prior Publication Data
US 2019/0130902 A1    May 2, 2019

(51) Int. Cl.
| *G10L 15/00* | (2013.01) |
| *G06F 17/27* | (2006.01) |
| *G10L 15/197* | (2013.01) |
| *G06F 17/28* | (2006.01) |
| *G10L 15/02* | (2006.01) |

(52) U.S. Cl.
CPC ........ *G10L 15/197* (2013.01); *G06F 17/2765* (2013.01); *G06F 17/2845* (2013.01); *G10L 15/02* (2013.01)

(58) Field of Classification Search
CPC ... G06F 17/277; G06F 17/2863; G10L 15/183
See application file for complete search history.

(56) References Cited

U.S. PATENT DOCUMENTS

| 5,721,939 | A | * | 2/1998 | Kaplan | .................. G06F 17/277 |
| | | | | | 704/1 |
| 5,806,021 | A | * | 9/1998 | Chen | ..................... G06F 17/277 |
| | | | | | 704/1 |
| 6,311,152 | B1 | | 10/2001 | Bai et al. | |
| 6,640,006 | B2 | * | 10/2003 | Wu | ........................ G06F 17/271 |
| | | | | | 382/177 |
| 6,738,741 | B2 | * | 5/2004 | Emam | ..................... G10L 15/04 |
| | | | | | 704/251 |
| 7,216,066 | B2 | * | 5/2007 | Di | ........................... G06F 17/27 |
| | | | | | 703/2 |

(Continued)

FOREIGN PATENT DOCUMENTS

EP    2 950 306 A1    2/2015

OTHER PUBLICATIONS

Teahan, William John. "Text classification and segmentation using minimum cross-entropy." Content-Based Multimedia Information Access—vol. 2. Le Centre De Hautes Etudes Internationales D'Informatique Documentaire, 2000. (Year: 2000).*

(Continued)

*Primary Examiner* — Jialong He
(74) *Attorney, Agent, or Firm* — Tutunjian & Bitetto, P.C.; Vazken Alexanian

(57) ABSTRACT

Vocabulary consistency for a language model may be improved by splitting a target token in an initial vocabulary into a plurality of split tokens, calculating an entropy of the target token and an entropy of the plurality of split tokens in a bootstrap language model, and determining whether to delete the target token from the initial vocabulary based on at least the entropy of the target token and the entropy of the plurality of split tokens.

20 Claims, 6 Drawing Sheets

(56) References Cited

U.S. PATENT DOCUMENTS

| | | | | |
|---|---|---|---|---|
| 7,584,102 | B2* | 9/2009 | Hwang | G10L 15/18 704/235 |
| 7,610,189 | B2* | 10/2009 | Mackie | G06F 17/2755 704/9 |
| 8,539,349 | B1* | 9/2013 | Kirshenbaum | G06F 17/2863 704/10 |
| 9,396,723 | B2* | 7/2016 | Lu | G10L 15/063 |
| 9,449,598 | B1 | 9/2016 | Rastrow et al. | |
| 9,460,080 | B2 | 10/2016 | Zhao et al. | |
| 2004/0210434 | A1* | 10/2004 | Wang | G06F 17/274 704/9 |
| 2005/0071148 | A1* | 3/2005 | Huang | G06F 17/2755 704/4 |
| 2008/0162118 | A1* | 7/2008 | Itoh | G06F 17/2735 704/10 |
| 2015/0100307 | A1* | 4/2015 | Sun | G06F 17/2785 704/9 |
| 2017/0142925 | A1 | 5/2017 | Nannes | |

OTHER PUBLICATIONS

Huang, Jin Hu, and David Powers. "Chinese word segmentation based on contextual entropy." Proceedings of the 17th Pacific Asia Conference on Language, Information and Computation. 2003. (Year: 2003).*

Cairns, Paul, et al. "Bootstrapping word boundaries: A bottom-up corpus-based approach to speech segmentation." Cognitive Psychology 33.2 (1997): 111-153. (Year: 1997).*

Magimai-Doss, Mathew, et al. "Entropy based classifier combination for sentence segmentation." 2007 IEEE International Conference on Acoustics, Speech and Signal Processing—ICASSP'07. vol. 4. IEEE, 2007. (Year: 2007).*

Padro Cirera, M., "Applying Causal-State Splitting Reconstruction Algorithm to Natural Language Processing Tasks" Tesi Doctoral—PhD Thesis, Ph.D. Program in Artificial Intelligence Departament de Llenguatges i Sistemes Informatics Universitat Politecnica de Catalunya, Barcelona (Jun. 2008) pp. 1-139.

Zitouni, I. et al., "Variable-Length Sequence Language Model for Large Vocabulary Continuous Dictation Machine" European Conference on Speech Communication and Technology—EUROSPEECH'99 (Sep. 1999) pp. 1-4.

Schuster, M. et al., "Japanese and Korean Voice Search" 2012 IEEE International Conference on Acoustics, Speech and Signal Processing (ICASSP) (Mar. 2012) pp. 5149-5152.

Mochihashi, D. et al., "Bayesian Unsupervised Word Segmentation with Nested Pitman—Yor Language Modeling" Proceedings of the 47th Annual Meeting of the ACL and the 4th IJCNLP of the AFNLP (Aug. 2009) pp. 100-108.

Nagata, M., "A stochastic Japanese morphological analyzer using a forward-DP backward-A* N-best search Algorithm" Proceeding COLING 94 Proceedings of the 15th conference on Computational linguistics (Aug. 1994) pp. 201-207, vol. 1.

* cited by examiner

Initial Vocabulary

| NO. | Token | Word Class | Reading |
|---|---|---|---|
| 1 | IBM技術支援センター | Noun | Ai-bi-emu-gijutu-shien-senta |
| 2 | IBM技術 | Noun | Ai-bi-emu-gijutu |
| 3 | 技術支援 | Noun | Gijutu-shien |
| 4 | 支援センター | Noun | Shien-senta |
| 5 | IBM | Noun | Ai-bi-emu |
| 6 | 技術 | Noun | Gijutu |
| 7 | 支援 | Noun | Shien |
| 8 | センター | Noun | Senta |
| ⋮ | ⋮ | ⋮ | ⋮ |

*FIG. 2*

METHOD FOR RE-ALIGNING CORPUS AND IMPROVING THE CONSISTENCY

BACKGROUND

Technical Field

The present invention relates to improving language models with consistent vocabulary.

Related Art

A text corpus is essential in building a language model used for a variety of natural language processes, such as speech recognition and machine translation. Inconsistency of token units in a text corpus has been a reported issue with some Asian (e.g., Japanese, Korean, etc.) languages. The inconsistency of token units in a text corpus may impair the quality of the language model.

SUMMARY

According to an aspect of the present invention, provided is a method, including splitting a target token in an initial vocabulary into a plurality of split tokens, calculating an entropy of the target token and an entropy of the plurality of split tokens in a bootstrap language model, and determining whether to delete the target token from the initial vocabulary based on at least the entropy of the target token and the entropy of the plurality of split tokens.

According to another aspect of the present invention, provided is a method, including merging a plurality of target tokens in an initial vocabulary into a merged token, calculating an entropy of the plurality of target tokens and an entropy of the merged token in a bootstrap language model, and determining whether to add the merged token to the initial vocabulary based on at least the entropy of the plurality of target tokens and the entropy of the merged token.

These aspects may also include an apparatus performing these methods, and a computer program product storing instructions embodied on a computer-readable medium or programmable circuitry, for causing a processor or the programmable circuitry to perform the methods. The summary clause does not necessarily describe all features of the embodiments of the present invention. Embodiments of the present invention may also include sub-combinations of the features described above.

BRIEF DESCRIPTION OF THE DRAWINGS

FIG. 2 shows an exemplary table of an initial vocabulary according to an embodiment of the present invention.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
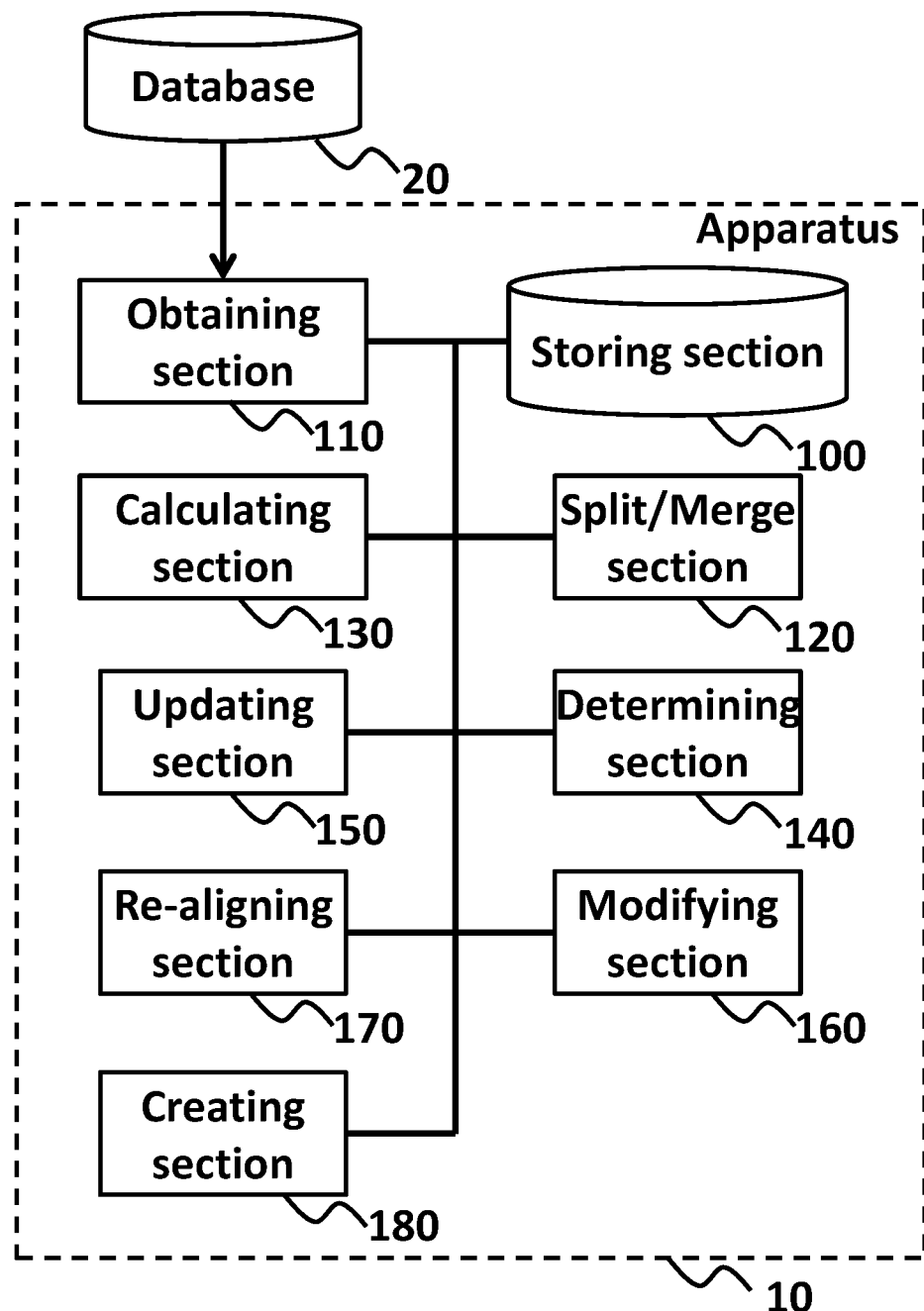
FIG. 1 shows an exemplary configuration of an apparatus 10, according to an embodiment of the present invention.

FIG. 1 shows an exemplary configuration of an apparatus 10, according to an embodiment of the present invention. The apparatus 10 may improve the quality of language model by improving consistency of vocabulary with less computational resources. The apparatus 10 may include a processor and/or programmable circuitry.

The apparatus 10 may further include one or more computer readable mediums collectively including instructions. The instructions may be embodied on the computer readable medium and/or programmable circuitry. The instructions, when executed by the processor or the programmable circuitry, may cause the processor or the programmable circuitry to operate as a plurality of operating sections.

Thereby, the apparatus 10 may be regarded as including a storing section 100, an obtaining section 110, a split/merge section 120, a calculating section 130, a determining section 140, an updating section 150, a modifying section 160, a re-aligning section 170, and a creating section 180.

The storing section 100 may store information used for the processing that the apparatus 10 performs. The storing section 100 may also store a variety of data/instructions used for operations of the apparatus 10. One or more other elements in the apparatus 10 (e.g., the obtaining section 110, the split/merge section 120, the calculating section 130, the determining section 140, the updating section 150, the modifying section 160, the re-aligning section 170, and the creating section 180) may communicate data directly or via the storing section 100, as necessary.

The storing section 100 may be implemented by a volatile or non-volatile memory of the apparatus 10. In some embodiments, the storing section 100 may store vocabulary, text corpus, language model(s), and other data related thereto.

The obtaining section 110 may obtain an initial vocabulary, a bootstrap language model, and/or a text corpus. The obtaining section 110 may obtain the initial vocabulary, the bootstrap language model, and/or the text corpus from the storing section 100 or an external database, such as a database 20.

The initial vocabulary is generated from the text corpus. In some embodiments, the initial vocabulary may include a plurality of tokens that the text corpus includes. The tokens may indicate locations where text is separated in the text corpus. In an embodiment, the tokens may correspond to words appearing in the text corpus. In an embodiment, the initial vocabulary may include a spelling as well as a word class, a pronunciation (or a reading), one or more variations (e.g., substantially the same word(s)), and/or one or more conjugations for each token. In some embodiments, the apparatus or another computer may generate initial vocabulary from text corpus by known methods.

The bootstrap language model may include occurrence probabilities of a word (e.g., a token), a phrase (e.g., consecutive tokens), and/or a sentence including tokens in the initial vocabulary. In some embodiments, the apparatus or another computer may generate the bootstrap language model from the text corpus and the initial vocabulary.

The split/merge section 120 may perform splitting of a token and/or merging of tokens in the initial vocabulary. In an embodiment, the split/merge section 120 may split a token in the initial vocabulary into a plurality of split tokens. In an embodiment, the split/merge section 120 may merge a plurality of tokens in the initial vocabulary into a merged token. Hereinafter, the token to be split may be referred to as a "target token" and the tokens to be merged may be referred to as "target tokens." The split/merge section 120 may perform the splitting and/or the merging on all or a portion of the tokens in the initial vocabulary.

The calculating section 130 may calculate an entropy of the target token and an entropy of the plurality of split tokens in the bootstrap language model. The calculating section 130 may calculate an entropy of the plurality of target tokens and an entropy of the merged token in a bootstrap language model. In an embodiment, the calculating section 130 may perform the calculation by utilizing the occurrence probabilities of the bootstrap language model.

The determining section 140 may determine whether to edit the initial vocabulary based on at least a result of calculation by the calculating section 130. The determining section 140 may determine whether to delete the target token from the initial vocabulary based on at least the entropy of the target token and the entropy of the plurality of split tokens. The determining section 140 may determine whether to add the merged token to the initial vocabulary based on at least the entropy of the plurality of target tokens and the entropy of the merged token.

The updating section 150 may update the initial vocabulary based on at least a result of the determination by the determining section 140, to generate an updated vocabulary. The updating section 150 may reflect the determination of the splitting and/or the merging for all target tokens at once in the initial vocabulary.

The modifying section 160 may modify the bootstrap language model based on at least the updated vocabulary updated by the updating section 150.

The re-aligning section 170 may re-align the text corpus based on at least the updated vocabulary updated by the updating section 150.

The creating section 180 may create a new language model based on at least the re-aligned text corpus.

FIG. 2 shows an exemplary table of an initial vocabulary according to an embodiment of the present invention. In the embodiment of FIG. 2, the initial vocabulary includes a plurality of tokens. For example, the initial vocabulary includes a token "IBM 技術支援センター". The initial vocabulary also includes tokens that are portions of the token "IBM 技術支援センター", such as "IBM 技術", " 技術支援 ", "支援センター", "IBM", "技術", and "支援", "センター."

With such vocabulary, texts including a character string "IBM 技術支援センター" in text corpus may be regarded as having the token "IBM 技術支援センター" in some cases. In other cases, the texts may be regarded as having two tokens "IBM 技術 " and "支援センター" This inconsistency in text corpus may impair the quality of the language model.

The initial vocabulary may include information of word class and reading. For example, the token "IBM 技術支援センター" is classified as noun, and has reading of "Ai-bi-emu-gijutu-shien-senta" in Japanese. FIG. 2 shows tokens relative to "IBM 技術支援センター" for explanation, but in actuality the initial vocabulary may include a richer variety of tokens.

Figure 3:
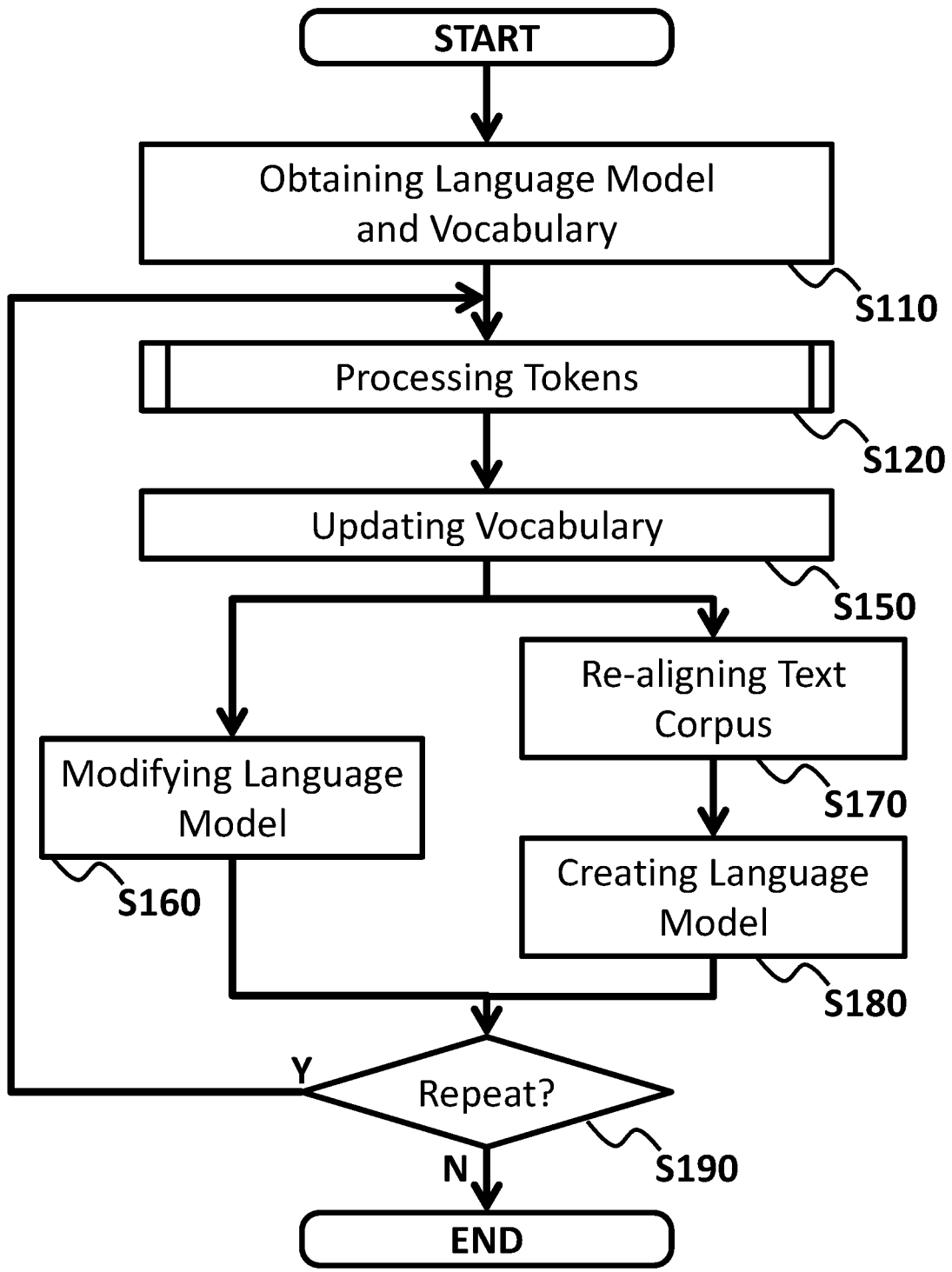
FIG. 3 shows an operational flow according to an embodiment of the present invention.

FIG. 3 shows an operational flow according to an embodiment of the present invention. The present embodiment describes an example in which an apparatus, such as the apparatus 10, performs operations from S110 to S190, as shown in FIG. 3.

At S110, an obtaining section such as the obtaining section 110 may obtain an initial vocabulary and a bootstrap language model from a storing section, such as the storing section 100 and/or an external database such as the database 20. The initial vocabulary and the bootstrap language model may be prepared from the text corpus. The initial vocabulary may be prepared further from an external dictionary which may be stored in the external database.

In an embodiment, the initial vocabulary may be derived from tokens in the text corpus. The text corpus may initially be manually tokenized based on a predetermined rule. However, manually tokenized text corpus tends to include inconsistencies in tokenization. Thus, initial vocabularies also tend to include inconsistency. The external dictionary may cause the inconsistency in the initial vocabularies.

The bootstrap language model may be generated from the text corpus that may be used for generation of the initial vocabulary, by a known method. In an embodiment, the apparatus may generate the bootstrap language model from the text corpus and the initial vocabulary with software prior to the operation of S110. The bootstrap language model may include occurrence probabilities of tokens for calculating the entropy for each token and/or for each of two or more consecutive tokens.

In an embodiment, the bootstrap language model may include uni-gram probabilities for the tokens, such as $p(w_1), \ldots, p(w_I)$ where $p(x)$ represents occurrence probability of token x, and $w_i$ (i=1 . . . I) represents the i-th token in the initial vocabulary.

In an embodiment, the bootstrap language model may also include bigram probabilities for the tokens, such as $p(w_i|w_j)$ for combination of i-th token $w_i$ and (i−1)th token (i=1, . . . , I) in the initial vocabulary. In an embodiment, the bootstrap language model may also include $p(w_i|BOS)$ for each token $w_i$ in the initial vocabulary, where BOS represents Beginning of Sentence.

In an embodiment, the bootstrap language model may also include trigram and/or N-gram (N>3) probabilities for the tokens. In a specific embodiment, the bootstrap language model may include uni-gram probabilities, bigram probabilities, and trigram probabilities.

At S120, a split/merge section, such as the split/merge section 120, a calculating section, such as the calculating section 130, and a determining section, such as the determining section 140, may process the tokens in the initial vocabulary. In an embodiment, the split/merge section, the calculating section, and the determining section may perform a splitting of a token in the initial vocabulary, and/or a merging a plurality of tokens in the initial vocabulary. The split/merge section, the calculating section, and the determining section may perform the process of the splitting and the merging in parallel.

Figure 4:
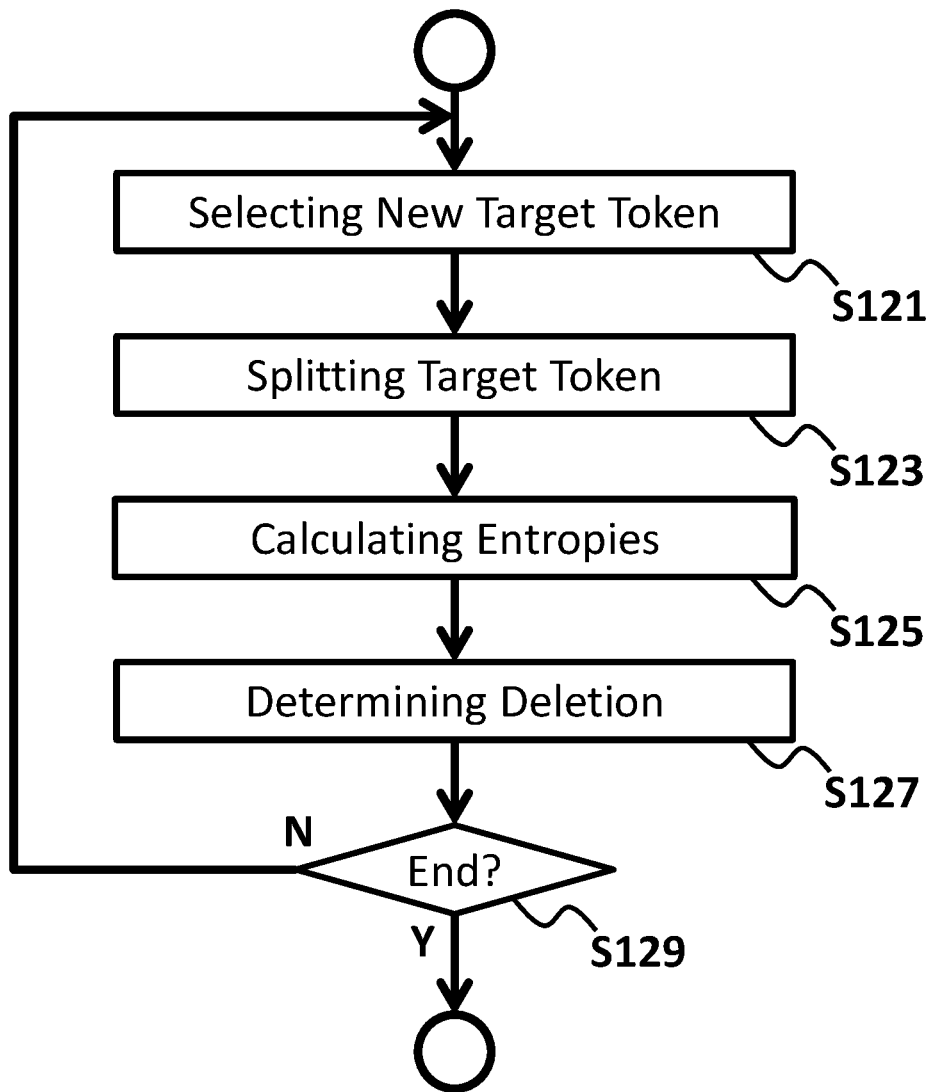
FIG. 4 shows a sub-flow of token processing according to an embodiment of the present invention.
Figure 5:
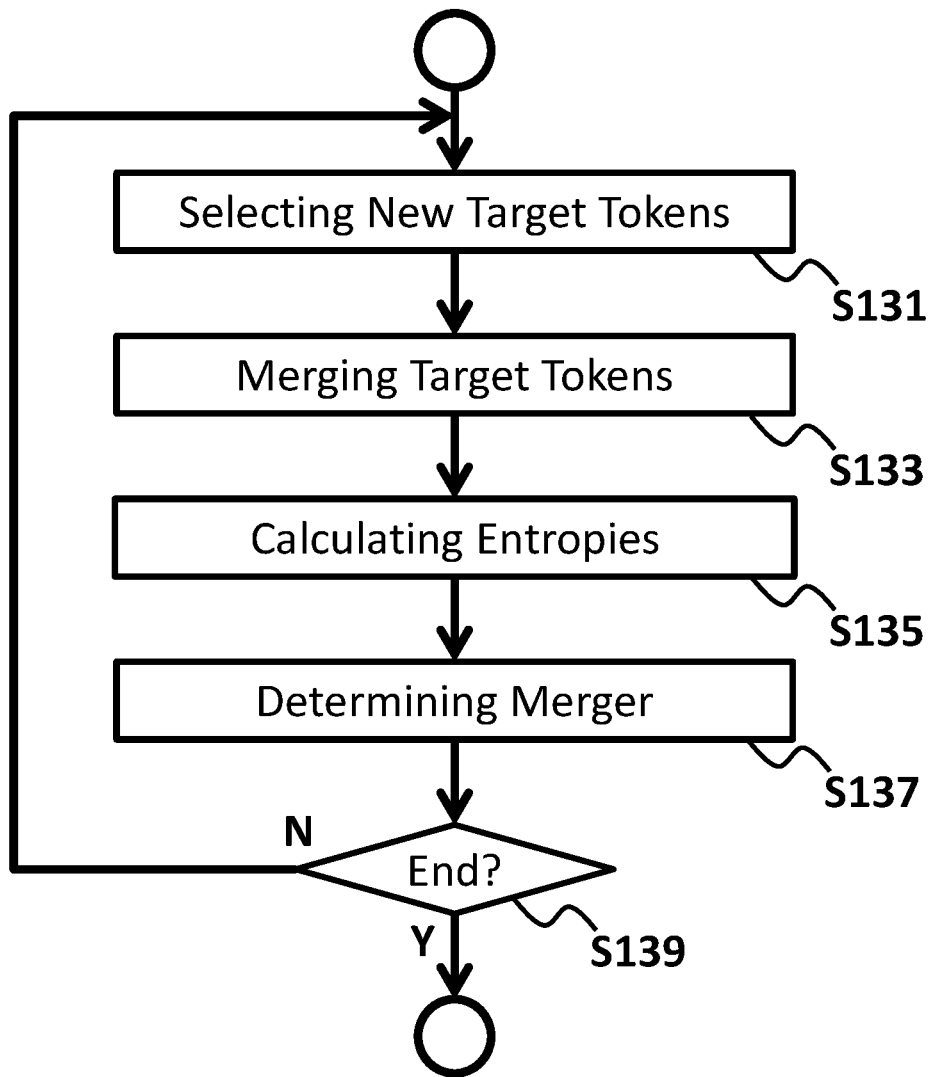
FIG. 5 shows a sub-flow of token processing according to another embodiment of the present invention.

FIG. 4 shows a sub-flow of the split/merge section performing the splitting. FIG. 5 shows a sub-flow of the split/merge section performing the merging. Referring to FIG. 4, the split/merge section may perform the operations from S121 to S129 at S120 in FIG. 3.

At S121, the split/merge section may select a token from the initial vocabulary as a target token. In some embodiments, the split/merge section may select a new token that has not been selected yet at S120 for the splitting. In some embodiments, the split/merge section may select the new token that has a length larger than a threshold. By setting the threshold, the split/merge section prevents very short words from being split.

In an embodiment, the split/merge section may select as the new token the token that has the longest length (e.g., the highest number of characters) among unprocessed tokens in the initial vocabulary. In another embodiment, the split/merge section may select as the new token the token that has the shortest length (e.g., the smallest number of characters) among unprocessed tokens in the initial vocabulary. In a specific embodiment, the split/merge section may select a token "IBM 技術支援センター" from the initial vocabulary shown in FIG. 2, as the target token.

At S123, the split/merge section may split the target token selected at S121 into a plurality of split tokens. In an embodiment, the split/merge section may split the target token into split tokens that are already included in the initial vocabulary. In an embodiment, the split/merge section may generate all possible combinations of the split tokens from the initial vocabulary. In an embodiment, if it is not possible to split the target token such that the plurality of split tokens are all already included in the initial vocabulary, then the split/merge section may go back to S121 to select another token as the target token.

For example, the split/merge section may split the target token "IBM 技術支援センタ ー" into (1) two tokens "IBM 技術" and "支援センター", (2) three tokens "IBM" and "技術支 援" and "センター", (3) three tokens "IBM", "技術", and "支援センター", (4) three tokens "IBM 技術", "支援", and "センター", (5) four tokens "IBM", "技術", "支援", and "センター."

On the other hand, for example, the split/merge section may NOT split the target token "IBM 技術支援センター" into (6) two tokens "IBM 技" and "術支援センター" because neither "IBM 技" nor "術支援センター" are included in the initial vocabulary. In some embodiments, the split/merge section may never split a target token "IBM" when "TB" and "BM" are NOT included in the initial vocabulary.

In an embodiment, the split/merge section may split the target token based on Liaison rules for the target token and the plurality of split tokens. For example, if the split/merge section detects that a pronunciation or reading of the target token does not correspond or substantially correspond to a concatenation of pronunciation or reading of the plurality of split tokens in the initial vocabulary, then the split/merge section may not allow such splitting.

At S125, a calculating section, such as the calculating section 130, may calculate an entropy of the target token and an entropy of the plurality of split tokens in the bootstrap language model. The calculating section may calculate the entropy of the target token based on occurrence probability of the target token in the bootstrap language model. The calculating section may calculate the entropy of the plurality of split tokens based on an N-gram occurrence probability of the plurality of split tokens.

In an embodiment, the entropy $H(w_T)$ of the target token $w_T$ may be represented as:

$$H(w_T) = -\log p(w_T) \quad (1).$$

The entropy $H(w_1, \ldots, w_n)$ of the split tokens $w_1, \ldots, w_n$ may be represented as:

$$H(w_1, \ldots, w_n) = -\log[p(w_1|BOS) \times p(w_2|BOS,w_1) \times \ldots p(w_n|BOS,w_1, w_2, \ldots, w_{n-1})] \quad (2)$$

The calculating section may calculate the $H(w_T)$ and $H(w_1, \ldots, w_n)$ according to the above formulae 1-2.

The entropy $H(w_1, \ldots, w_n)$ may be approximated by N-gram as:

$$H(w_1, \ldots, w_n) = -\log \Pi_i p(w_i|w_{i-N+1}, w_{i-N+2}, \ldots, w_{i-1}) \quad (3)$$

The calculating section may calculate $H(w_1, \ldots, w_n)$ according to formula 3 as the entropy of the plurality of split tokens instead of formula 2. In an embodiment, N is 3, and the calculating section may calculate $H(w_1, \ldots, w_n)$ as the plurality of split tokens according to the following formula 4:

$$H(w_1, \ldots, w_n) = -\log \Pi_i p(w_i|w_{i-2}, w_{i-1}) \quad (4).$$

In formula 4, when i=1, $p(w_i|w_{i-1}, w_{i-2})$ may be replaced by $p(w_1|BOS)$, when i=2, $p(w_i|w_{i-2}, w_{i-1})$ may be replaced by $p(w_2|BOS, w_1)$.

The calculating section may eliminate BOS from the calculation of $H(w_1, \ldots, w_n)$. In an embodiment, the calculating section may calculate $H(w_1, \ldots, w_n)$ based on a unigram occurrence probability $p(w_1)$ of a lead token $w_1$ in the plurality of split tokens $(w_1, \ldots, w_n)$. In such embodiments, when i=1, $p(w_i|w_{i-2}, w_{i-1})$ may be replaced by $p(w_1)$, when i=2, $p(w_i|w_{i-2}, w_{i-1})$ may be replaced by $p(w_2|w_1)$ in formula 4.

For example, the calculating section may obtain H("IBM 技術", "支援センター") by calculating −log [p("IBM 技術")× p("支援センター"|"IBM 技術")], and obtain H("IBM", "技術", "支援", "センター")] by calculating −log [p("IBM")×p("技術"|"IBM")×p("支援"|"IBM", "技術")× p("センター"|"技術", "支援")] with trigram approximation.

A token often appears in a middle of a sentence, and rarely appears in the beginning of a sentence. By eliminating BOS from the calculation, the calculation may reflect a manner that tokens appear in sentences. The calculating section may store the result of calculations in a storing section such as the storing section 100.

At S127, a determining section, such as the determining section 140, may determine whether to delete the target token from the initial vocabulary based on a result of the calculation at S125. In an embodiment, the determining section may determine to delete the target token when the entropy of the plurality of split tokens plus a regularization term is smaller than the entropy of the target token. The regularization term may be a positive parameter and may be set based on an average token length of the split tokens.

In an embodiment, the determining section may determine to delete the target token $w_T$ if $H(w_1, \ldots, w_n) + \delta/$(average token length of $w_1, \ldots, w_n$) $< H(w_T)$, where $\delta$ is a preset control parameter. For example, the determining section may determine to delete the target token "IBM 技術支援センター" if H("IBM 技術", "支援センター")+δ/5.5) <H("IBM 技術支援センター"), if H("IBM 技術", "支援", "センター")+δ/3.67)<H("IBM 技術支援センター"), if H("IBM", "技術", "支援センター")+δ/3.67)<H("IBM 技術支援センター"), if H("IBM", "技術支援", "センター")+δ/3.67)<H("IBM 技術支援センター"), or if H("IBM", "技術", "支援", "センタ ー")+δ/2.75)<H("IBM 技術支援センター").

In an embodiment, the determining section may determine that a set of split tokens that has the lowest entropy among a plurality set of the plurality of split tokens, as the most dominant split tokens. For example, in response to determining that [H("IBM 技術", "支援センタ ー")+δ/5.5] is smaller than H("IBM 技術", "支援", "センター")+δ/3.67), H("IBM", "技術", "支 援センター")+δ/3.67), H("IBM", "技術支援", "センター")+δ/3.67), and H("IBM", "技術", "支援", "センター")+δ/2.75), the determining section may determine the split tokens "IBM 技術" and "支援センター" as the most dominant split tokens.

The determining section may store the result of determination to the storing section.

At S129, the split/merge section may determine whether to further select another target token to proceed from S121 again. In an embodiment, the split/merge section may determine to select another target token if there is at least one token that has not been selected at a previous iteration of S121 in the initial vocabulary. In an embodiment, the split/merge section may determine to select another target token if the number of tokens that have been selected as the target token at previous iterations of S121 is less than a threshold number.

Referring to FIG. 5, the split/merge section may perform the operations from S131 to S139 at S120 in FIG. 3.

At S131, the split/merge section may select a plurality of tokens from the initial vocabulary as the plurality of target tokens. In an embodiment, the split/merge section may select a new combination of tokens that has not been selected yet at a previous iteration of S120 for the merging. The split/merge section may select a predetermined number (e.g., 2) of tokens as the target tokens.

In an embodiment, the split/merge section may select the new tokens such that a sum of length of the new tokens does not exceed a threshold. For example, the split/merge section may select a token "IBM 技術" and a token "支援センター" as the target tokens.

At S133, the split/merge section may merge the target tokens selected at S131 into a merged token. In an embodiment, the split/merge section may merge the target tokens such that the merged token is already included in the initial vocabulary. For example, the split/merge section may merge the target token "IBM 技術" and the target token "支援センター" into a merged token "IBM 技術支援センター" In another embodiment, the split/merge section may merge the target tokens regardless of whether the merged token is already included in the initial vocabulary.

In an embodiment, the split/merge section may merge the plurality of target tokens based on Liaison rules for the target token and the plurality of split tokens. For example, if the split/merge section detects that pronunciation or reading of the target tokens does not correspond or substantially correspond to a concatenation of pronunciation or reading of the merged token in the initial vocabulary, then the split/merge section may not allow such merging.

At S135, the calculating section may calculate an entropy of the plurality of target tokens and an entropy of the merged token in the bootstrap language model. In an embodiment, the calculating section may calculate the entropy of the plurality of target tokens based on N-gram occurrence probabilities of the plurality of target tokens in the bootstrap language model. In an embodiment, the calculating section may calculate the entropy of the merged token based on occurrence probability of the merged token in the bootstrap language model. The calculating section may perform the calculation in the same or similar manner as explained in relation to S125.

In an embodiment, if the merged token does not exist in the initial vocabulary, then the calculating section may calculate the entropy of the merged token using an occurrence probability of Out of Vocabulary (or OOV). The calculating section may use p(OOV)/(number of OOV) instead of the occurrence probability $p(w_m)$ of the merged token $w_m$, where (number of OOV) may be a preliminary set. The calculating section may store the result of these calculations in the storing section.

At S137, the determining section may determine whether to merge the target tokens based on a result of calculation at S135. In an embodiment, the determining section may determine to merge the target tokens when the entropy of the merged token is smaller than the entropy of the plurality of target tokens plus a regularization term. The regularization term may be set based on an average token length of the target tokens.

In an embodiment, the determining section may determine to merge the target tokens $w_1, \ldots w_n$ to generate the merged token $w_T$, if $H(w_1, \ldots, w_n)$+δ/(average token length of $w_1, \ldots, w_n$)>$H(w_T)$, where δ is a preset parameter, and may be the same as used at S127. For example, the determining section may determine to merge the target token "IBM 技術" and the target token "支援センター" if H("IBM 技術", "支援センター")+δ/5.5)>H("IBM 技術支援センター"). The determining section may store the result of the determination to the storing section.

At S139, the split/merge section may determine whether to select another plurality of target tokens to proceed from S131 again. In an embodiment, the split/merge section may determine to select another combination of the target tokens if there is at least one combination of tokens in the initial vocabulary that has not been selected at a previous iteration of S131. In an embodiment, the split/merge section may determine to select another plurality of target tokens if the number of combinations that have been selected as the target tokens at previous iterations of S131 is less than a threshold number.

Referring back to FIG. 3, at S150, an updating section such as the updating section 150 may update the initial vocabulary based on a result of the determination made at S120, to generate an updated vocabulary. The updating section may perform the update to reflect all determinations made at iterations of S121-S129 and/or S131-S139.

In an embodiment, the updating section may delete, from the initial vocabulary, the target tokens that the determining section determined to delete at the iterations of S127. In an embodiment, the updating section may add, to the initial vocabulary, the merged tokens that the determining section determined to generate at the iterations of S137 but that were not already included in the initial vocabulary. In an embodiment, the updating section may perform the deleting and/or the merging so as to maximize a decrease of the entropies in the bootstrap language model as a whole.

After the operation of S150, the apparatus may (i) directly modify the bootstrap language model, or (ii) re-align the text corpus and create a new language model based on the re-aligned text corpus. When performing process (i), the apparatus may proceed with an operation of S160. When performing process (ii), the apparatus may proceed with operations of S170-S180.

At S160, a modifying section, such as the modifying section 160, may modify the bootstrap language model based on the updated vocabulary updated at S150. In an embodiment, the modifying section may distribute an occurrence probability of the deleted target token to occurrence probabilities of the plurality of split tokens. For example, the modifying section may distribute the occurrence probability p("IBM 技術支援センター") of the deleted target token "IBM 技術支援センター" to the occurrence probabilities p("IBM 技術") and p("支援センタ—") of the most dominant split tokens "IBM 技術" and "支援センター."

In an embodiment, the modifying section may evenly distribute the occurrence probability of the deleted target token among the split tokens. In an embodiment, the modifying section may unevenly distribute the occurrence probability of the deleted target token among the split tokens. For example, in response to determining that one of the split tokens (e.g., "支援センター") is included in an irrelevant token (e.g., "エンジニア支援センター") in the updated vocabulary, then the modifying section may reduce an allocation of the occurrence probability to such token (e.g., "支援センター") and increase the allocation of the occurrence probability to the other split token (e.g., "IBM 技術").

In an embodiment, the modifying section may allocate at least a portion of occurrence probabilities of the plurality of target tokens to an occurrence probability of the merged token. For example, the modifying section may allocate the occurrence probability p("IBM 技術") of the target token "IBM 技術" and the occurrence probability p("支援センター") of the target token "支援センター" to the occurrence probabilities p("IBM 技術支援センター") of the merged token "IBM 技術支援センター."

At S170, a re-aligning section, such as the re-aligning section 170, may re-align the text corpus based on the updated vocabulary updated at S150. The text corpus to be re-aligned may be the same as or different from the text corpus that is used for generating the initial vocabulary and/or the bootstrap language model.

In some embodiments, the re-aligning section may apply the determinations made at S127 and/or S137 directly to the text corpus without the updated vocabulary, thereby splitting and/or merging tokens in the text corpus. In such embodiments, the apparatus may not perform the operation of S150.

At S180, a creating section, such as the creating section 180, may create a new language model based on the re-aligned text corpus. In an embodiment, the creating section may calculate uni-gram probabilities for the tokens, bigram probabilities for the tokens, trigram probabilities for the tokens, ..., and/or N-gram probabilities for the tokens that can be used for the calculation at S125 and/or S135.

After S160/S180, the apparatus may repeat a loop of S120-S160 or S120-S180 in order to further improve consistency of the vocabulary and quality of the language model. If repeating the loop, the apparatus may treat the updated vocabulary as the initial vocabulary and the modified/created language model as the bootstrap language model in the next loop.

Figure 6:
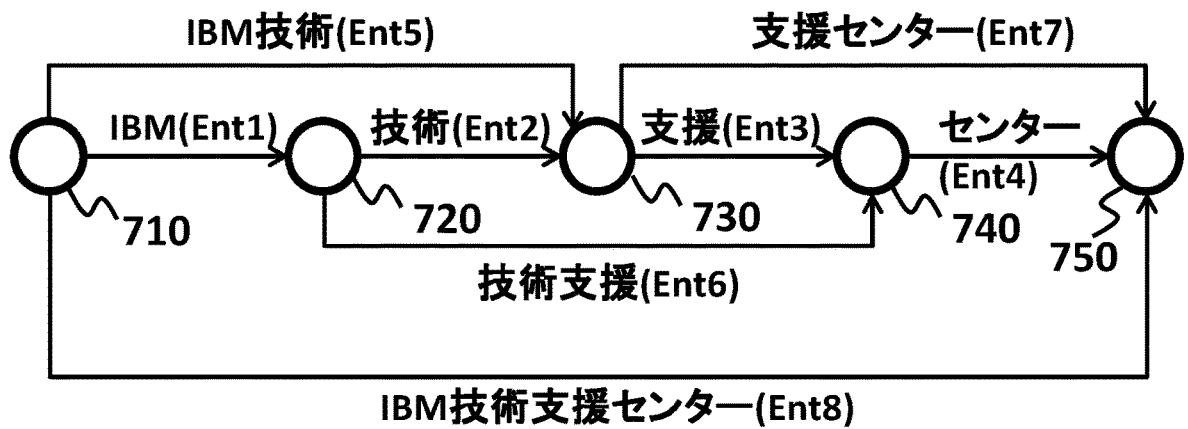
FIG. 6 shows a graph structure explaining the splitting, the calculating, and the determination of token merger or deletion, according to an embodiment of the present invention.

FIG. 6 shows a graph structure explaining the splitting, the calculating, and the determining during S123-S127 according to an embodiment of the present invention. At S123, the split/merge section may generate the graph structure as shown in FIG. 6 by generating all possible split tokens. The graph structure includes nodes 710, 720, 730, 740, 750 and edges that connect the nodes. The edges correspond to the tokens, which are the same tokens as shown in FIG. 2.

For example, an edge between 710-750 (referred to as "edge 710-750") corresponds to the target token "IBM 技術支援センター" and an edge 710-720 corresponds to the split token "IBM."

At S125, the calculating section may calculate entropies for all edges. For example, the calculating section may calculate the entropy of "IBM" shown as "Ent1", the entropy of "技術" shown as "Ent2", the entropy of "支援" shown as "Ent3", the entropy of "センター" shown as "Ent4", the entropy of "IBM 技術" shown as "Ent5", the entropy of "技術支援" shown as "Ent6", and the entropy of "支援センター" shown as "Ent7."

At S127, the determining section may determine the best path among all possible paths from the node 710 to the node 750. The best path has the smallest entropy. The determining section may calculate the entropy of each path by summing all entropies of edges included in the each path.

For example, (i) a path passes nodes 710-750 has the entropy of Ent8, (ii) a path passes nodes 710-730-750 has the entropy of Ent5+Ent7, (iii) a path passes nodes 710-730-740-750 has the entropy of Ent5+Ent3+Ent4, (iv) a path passes nodes 710-720-730-750 has the entropy of Ent1+Ent2+Ent7, (v) a path passes nodes 710-720-740-750 has the entropy of Ent1+Ent6+Ent4, and (vi) a path passes nodes 710-720-730-740-750 has the entropy of Ent1+Ent2+Ent3+Ent4.

Then, the determining section may select one path that has the smallest entropy. In an embodiment, the determining section may take a regularization term into consideration. For example, the determining section may select the smallest one among (Ent8), (Ent5+Ent7+ regularization term), (Ent5+Ent3+Ent4+ regularization term), (Ent1+Ent2+Ent7+ regularization term), (Ent1+Ent6+Ent4+ regularization term), and (Ent1+Ent2+Ent3+Ent4+ regularization term).

The determining section may determine tokens corresponding to the selected path as the most dominant split tokens. For example, if (Ent5+Ent3+Ent4+ regularization term) is the smallest, then the determining section determines tokens "IBM 技術", "支援" and "センター" as the dominant split tokens at S127.

The determining section may perform the operation of S127 in the same or similar manner as disclosed in M. Nagata, "A stochastic Japanese morphological analyzer using a forward-DP backward-A* N-best search algorithm", Proceeding COLING 94 Proceedings of the 15th conference on Computational linguistics, Volume 1, Pages 201-207.

The apparatus may reduce redundancy by avoiding performing substantially the same process. For example, if a target token has already been treated as a split token in a previous loop of S121-S129, then the apparatus may skip at least some of operations S121-S129.

For example, after the apparatus performs operations S121-S129 for the token "IBM 技 術支援センサー", the apparatus may not perform the operation of S125 for the token "IBM 技 術" since entropies of "IBM 技術", "IBM", and "技術" have already been calculated.

As explained above, the apparatus may update the initial vocabulary by splitting/merging tokens so as to reduce the entropy in a language model, thereby improving consistency of vocabulary and quality of the language model with less computational resources.

Figure 7:
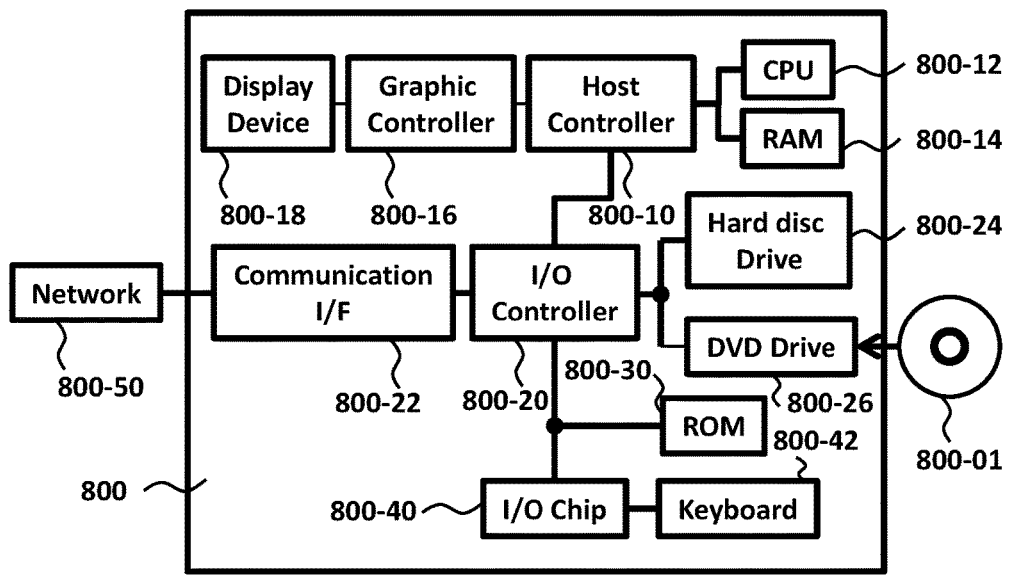
FIG. 7 shows an exemplary hardware configuration of a computer that functions as a system, according to an embodiment of the present invention.

FIG. 7 shows an exemplary hardware configuration of a computer configured for improving the vocabulary for language model, according to an embodiment of the present invention. A program that is installed in the computer 800 can cause the computer 800 to function as or perform operations associated with apparatuses of the embodiments of the present invention or one or more sections (including modules, components, elements, etc.) thereof, and/or cause the computer 800 to perform processes of the embodiments of the present invention or steps thereof. Such a program may be executed by the CPU 800-12 to cause the computer 800 to perform certain operations associated with some or all of the blocks of flowcharts and block diagrams described herein.

The computer 800 according to the present embodiment includes a CPU 800-12, a RAM 800-14, a graphics controller 800-16, and a display device 800-18, which are mutually connected by a host controller 800-10. The computer 800 also includes input/output units such as a communication interface 800-22, a hard disk drive 800-24, a DVD-ROM drive 800-26 and an IC card drive, which are connected to the host controller 800-10 via an input/output controller 800-20. The computer also includes legacy input/output units such as a ROM 800-30 and a keyboard 800-42, which are connected to the input/output controller 800-20 through an input/output chip 800-40.

The CPU 800-12 operates according to programs stored in the ROM 800-30 and the RAM 800-14, thereby controlling each unit. The graphics controller 800-16 obtains image data generated by the CPU 800-12 on a frame buffer or the like provided in the RAM 800-14 or in itself, and causes the image data to be displayed on the display device 800-18.

The communication interface 800-22 communicates with other electronic devices via a network 800-50. The hard disk drive 800-24 stores programs and data used by the CPU 800-12 within the computer 800. The DVD-ROM drive 800-26 reads the programs or the data from the DVD-ROM 800-01, and provides the hard disk drive 800-24 with the programs or the data via the RAM 800-14. The IC card drive reads programs and data from an IC card, and/or writes programs and data into the IC card.

The ROM 800-30 stores therein a boot program or the like executed by the computer 800 at the time of activation, and/or a program depending on the hardware of the computer 800. The input/output chip 800-40 may also connect various input/output units via a parallel port, a serial port, a keyboard port, a mouse port, and the like to the input/output controller 800-20.

A program is provided by computer readable media such as the DVD-ROM 800-01 or the IC card. The program is read from the computer readable media, installed into the hard disk drive 800-24, RAM 800-14, or ROM 800-30, which are also examples of computer readable media, and executed by the CPU 800-12. The information processing described in these programs is read into the computer 800, resulting in cooperation between a program and the above-mentioned various types of hardware resources. An apparatus or method may be constituted by realizing the operation or processing of information in accordance with the usage of the computer 800.

For example, when communication is performed between the computer 800 and an external device, the CPU 800-12 may execute a communication program loaded onto the RAM 800-14 to instruct communication processing to the communication interface 800-22, based on the processing described in the communication program. The communication interface 800-22, under control of the CPU 800-12, reads transmission data stored on a transmission buffering region provided in a recording medium such as the RAM 800-14, the hard disk drive 800-24, the DVD-ROM 800-01, or the IC card, and transmits the read transmission data to network 800-50 or writes reception data received from network 800-50 to a reception buffering region or the like provided on the recording medium.

In addition, the CPU 800-12 may cause all or a necessary portion of a file or a database to be read into the RAM 800-14, the file or the database having been stored in an external recording medium such as the hard disk drive 800-24, the DVD-ROM drive 800-26 (DVD-ROM 800-01), the IC card, etc., and perform various types of processing on the data on the RAM 800-14. The CPU 800-12 may then write back the processed data to the external recording medium.

Various types of information, such as various types of programs, data, tables, and databases, may be stored in the recording medium to undergo information processing. The CPU 800-12 may perform various types of processing on the data read from the RAM 800-14, which includes various types of operations, processing of information, condition judging, conditional branch, unconditional branch, search/replace of information, etc., as described throughout this disclosure and designated by an instruction sequence of programs, and writes the result back to the RAM 800-14.

In addition, the CPU 800-12 may search for information in a file, a database, etc., in the recording medium. For example, when a plurality of entries, each having an attribute value of a first attribute is associated with an attribute value of a second attribute, are stored in the recording medium, the CPU 800-12 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 800. In addition, a recording medium such as a hard disk or a RAM provided in a server system connected to a dedicated communication network or the Internet can be used as the computer readable media, thereby providing the program to the computer 800 via the network.

The present invention may be a system, a method, and/or a computer program product. The computer program product may include a computer readable storage medium (or media) having computer readable program instructions thereon for causing a processor to carry out aspects of the present invention. The apparatus of the embodiments of the present invention may include the computer readable medium and the processor or programmable circuitry operable to execute the instructions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention enable to improve language models with consistent vocabulary.

What is claimed is:

1. A computer program product including one or more computer readable storage mediums collectively storing program instructions that are executable by a processor or programmable circuitry to cause the processor or programmable circuitry to perform operations comprising:

splitting a target token in an initial vocabulary into a plurality of split tokens;

calculating an entropy of the target token and an entropy of the plurality of split tokens in a bootstrap language model; and determining whether to delete the target token from the initial vocabulary based on at least the entropy of the target token, a regularization term and the entropy of the plurality of split tokens to maximize a decrease of entropies in the bootstrap language model.

2. The computer program product according to claim 1,
wherein the calculating the entropy of the target token
includes calculating the entropy based on at least
occurrence probability of the target token in the bootstrap language model, and
wherein the calculating the entropy of the plurality of split
tokens includes calculating the entropy based on at
least an N-gram occurrence probability of the plurality
of split tokens.

3. The computer program product according to claim 2,
wherein the calculating the entropy based on at least an
N-gram occurrence probability is performed based on
at least a uni-gram occurrence probability of a lead
token in the plurality of split tokens.

4. The computer program product according to claim 1,
wherein the determining comprises determining to delete the
target token when the entropy of the plurality of split tokens
plus the regularization term is smaller than the entropy of the
target token.

5. The computer program product according to claim 1,
further comprising:
updating the initial vocabulary based on at least a result of
the determining, to generate an updated vocabulary.

6. The computer program product according to claim 5,
further comprising:
modifying the bootstrap language model based on at least
the updated vocabulary.

7. The computer program product according to claim 6,
wherein the modifying the bootstrap language model comprises distributing an occurrence probability of the deleted
target token to occurrence probabilities of the plurality of
split tokens.

8. The computer program product according to claim 5,
further comprising:
re-aligning a text corpus based on at least the updated
vocabulary; and
creating a new language model based on at least the text
corpus.

9. The computer program product according to claim 1,
wherein the splitting the target token is performed based on
at least Liaison rules for the target token and the plurality of
split tokens.

10. An apparatus comprising:
the computer program product of claim 1; and
a processor or programmable circuitry operable to execute
the instructions.

11. A computer program product including one or more
computer readable storage mediums collectively storing
program instructions that are executable by a processor or
programmable circuitry to cause the processor or programmable circuitry to perform operations comprising:
merging a plurality of target tokens in an initial vocabulary into a merged token;
calculating an entropy of the plurality of target tokens and
an entropy of the merged token in a bootstrap language
model; and
determining whether to add the merged token to the initial
vocabulary based on at least the entropy of the plurality
of target tokens, a regularization term and the entropy
of the merged token to maximize a decrease of entropies in the bootstrap language model.

12. The computer program product according to claim 11,
wherein the calculating the entropy of the plurality of
target tokens comprises calculating the entropy based
on at least an N-gram occurrence probability of the
plurality of target tokens in the bootstrap language
model, and
wherein the calculating the entropy of the merged token
comprises calculating the entropy based on at least
occurrence probability of the merged token in the
bootstrap language model.

13. The computer program product according to claim 12,
wherein the calculating the entropy based on at least an
N-gram occurrence probability is performed based on
at least a uni-gram occurrence probability of a lead
token in the plurality of target tokens.

14. The computer program product according to claim 11,
wherein the determining comprises determining to merge
the target tokens when the entropy of the merged token is
smaller than the entropy of the plurality of target tokens plus
the regularization term.

15. The computer program product according to claim 11,
further comprising:
updating the initial vocabulary based on at least a result of
the determining, to generate an updated vocabulary.

16. The computer program product according to claim 15,
further comprising:
modifying the bootstrap language model based on at least
the updated vocabulary.

17. The computer program product according to claim 16,
wherein the modifying the bootstrap language model comprises allocating at least a portion of occurrence probabilities
of the plurality of target tokens to an occurrence probability
of the merged token.

18. The computer program product according to claim 15,
further comprising:
re-aligning a text corpus based on at least the updated
vocabulary; and
creating a new language model based on at least the text
corpus.

19. An apparatus comprising:
the computer program product of claim 11; and
a processor or programmable circuitry operable to execute
the instructions.

20. A method, comprising
splitting a target token in an initial vocabulary into a
plurality of split tokens;
calculating an entropy of the target token and an entropy
of the plurality of split tokens in a bootstrap language
model; and
determining whether to delete the target token from the
initial vocabulary based on at least the entropy of the
target token, a regularization term and the entropy of
the plurality of split tokens to maximize a decrease of
entropies in the bootstrap language model.

* * * * *